United States Patent [19]

Takashima

[11] Patent Number: 4,655,732
[45] Date of Patent: Apr. 7, 1987

[54] V BELT WITH BLOCKS HAVING LOAD CARRYING ENGAGING MEANS

[75] Inventor: Takashi Takashima, Izumisao, Japan

[73] Assignee: Bando Chemical Industries, Ltd., Hyogo, Japan

[21] Appl. No.: 634,885

[22] Filed: Jul. 27, 1984

[30] Foreign Application Priority Data

| Jul. 29, 1983 | [JP] | Japan | 58-139895 |
| Feb. 24, 1984 | [JP] | Japan | 59-26531[U] |
| Feb. 24, 1984 | [JP] | Japan | 59-26532[U] |
| Mar. 6, 1984 | [JP] | Japan | 59-32567[U] |
| Mar. 7, 1984 | [JP] | Japan | 59-33441[U] |
| Mar. 12, 1984 | [JP] | Japan | 59-35786[U] |
| Apr. 26, 1984 | [JP] | Japan | 59-62548[U] |
| Apr. 26, 1984 | [JP] | Japan | 59-62550[U] |
| Sep. 9, 1984 | [JP] | Japan | 58-139741[U] |

[51] Int. Cl.$^4$ ............................ F16G 1/00; F16G 5/00
[52] U.S. Cl. ................................ 474/201; 474/242; 474/250
[58] Field of Search ............... 474/201, 242, 244, 245, 474/265, 251, 250

[56] References Cited

U.S. PATENT DOCUMENTS

| 2,194,833 | 3/1940 | Nassimbene | 474/250 |
| 3,016,755 | 1/1962 | Dittrich | 474/201 X |
| 4,484,903 | 11/1984 | Schneider | 474/201 X |

FOREIGN PATENT DOCUMENTS

| 2414989 | 10/1975 | Fed. Rep. of Germany | 474/201 |
| 65444 | 3/1982 | Japan | 474/201 |
| 256918 | 9/1948 | Switzerland | 474/201 |
| 2030263 | 4/1980 | United Kingdom | 474/201 |

Primary Examiner—James A. Leppink
Assistant Examiner—Matthew Smith
Attorney, Agent, or Firm—Auslander & Thomas

[57] ABSTRACT

A V belt to be used for a dry type transmission. It comprises two endless load carriers and a plurality of blocks in engagement with said load carriers relatively immovable in lengthwise direction of the belt. Said load carrier has elastomers and tensile members embedded in said elastomers. Said block is made of plastics or hard rubber and has slant side surfaces to fit substantially to the groove surface of a pulley on which the V belt is wound and a slot which extends from said slant side surface toward the central part of the block and in which the load carrier is fitted.

18 Claims, 36 Drawing Figures

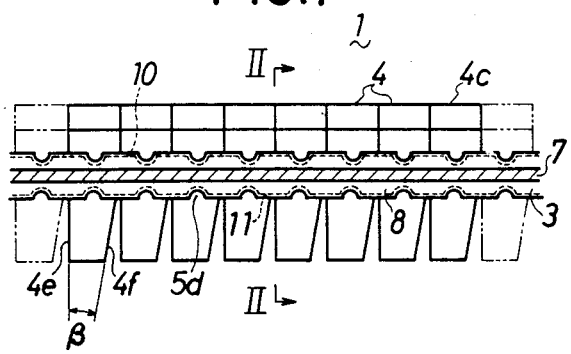
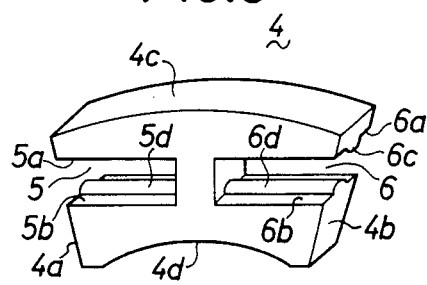
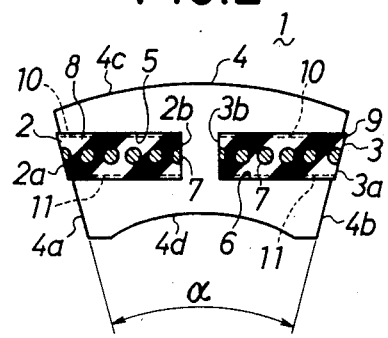
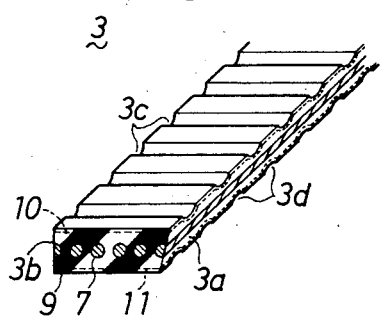
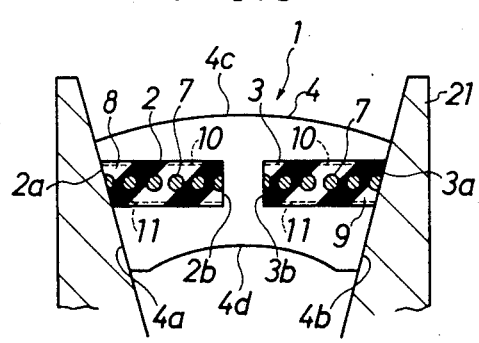

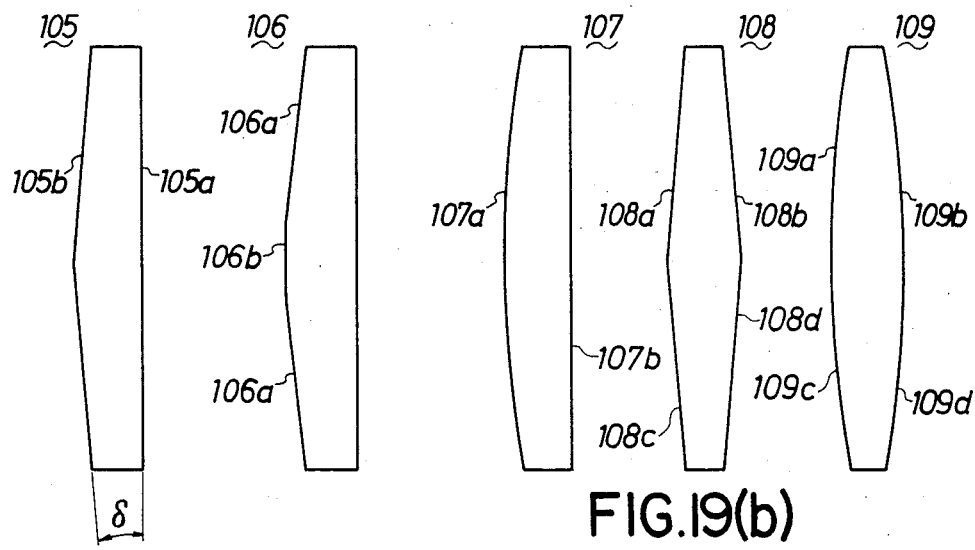

FIG. 25 (a)
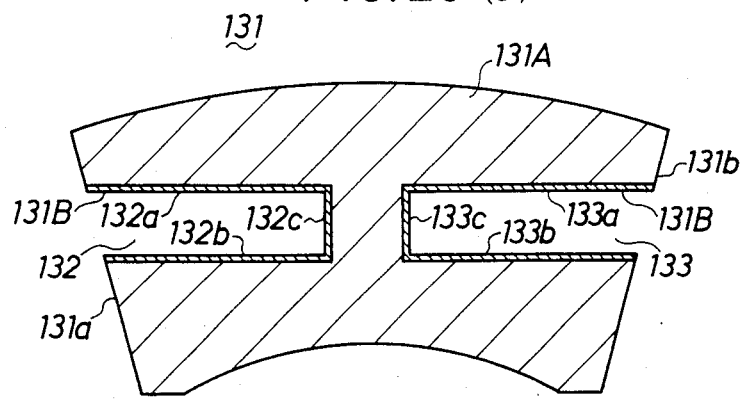
FIG. 25 (b)  FIG. 26  FIG. 27
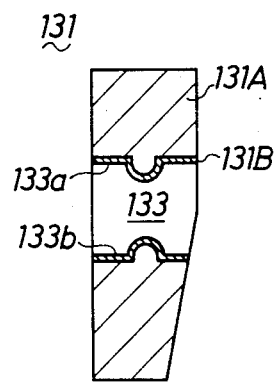 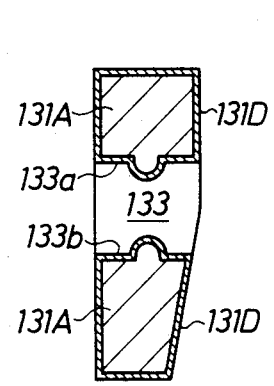 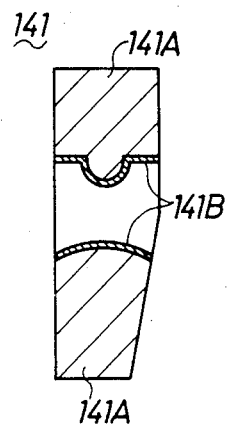
FIG. 28
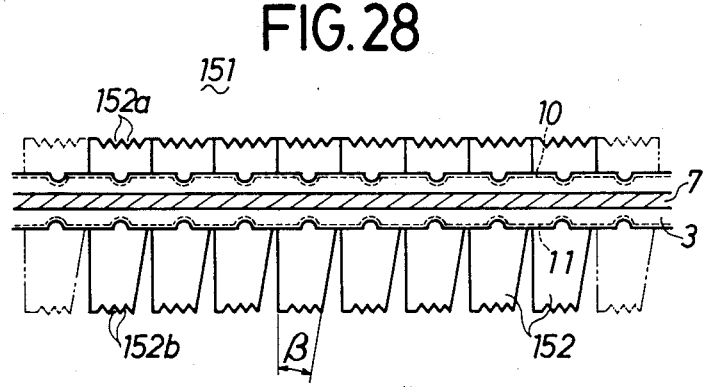

V BELT WITH BLOCKS HAVING LOAD CARRYING ENGAGING MEANS

BACKGROUND OF THE INVENTION

1. Field of the Invention

This invention relates to a V belt which is mainly used for high load transmitting in a dry type transmission. The V belt according to the present invention is usable not only as the V belt of a continuously variable transmission for motor vehicles but also as the V belt of a continuously variable or uncontinuously variable transmission for vehicles loaded with an engine, such as agricultural machines and civil engineering machines. Also, it is most suitable for a V belt for high load of general industrial machines to be driven by electric motors. Furthermore, it can be used as a belt for transportation or printing by utilizing the upper surface of its block.

2. Description of the Prior Art

For a transmission for running of a motor vehicle, a gear type transmission or an oil pressure type transmission is used. As a transmission having merits of both gear type and oil pressure type, development of a belt type continuously variable transmission with superior workability and less fuel expenses is in progress. This belt type continuously variable transmission comprises at least two pulleys which are variable in the width of grooves and fitted to a driving shaft and driven shafts and a V belt wound round at least two pulleys. Under this construction, continuous variations of speed are effected by varying the rotation pitch diameter by regulating the width of grooves.

These belt type continuously variable transmissions are available in two kinds. One is a wet type transmission using a metallic V belt (Japanese Patent Application Publication Gazette No. 55-6783, for example) and the other is a dry type transmission using a rubber V belt (Japanese Utility Model Application Publication Gazette No. 32-10408, for example). In general, variable transmission drive pulleys are composed by metallic materials, such as cast iron, steel, aluminum alloy, etc., and therefore metallic V belts must be used in lubricating oil to prevent overheating at the frictional surface and wear. However, rubber V belts are free from such trouble and therefore advantageous in the aspects of cost and maintenance.

A transmission for running of motor vehicles is required to have ability to transmit very high torque, for example, when the maximum torque of 1,000 cc engine is transmitted by a rubber V belt, a V belt must stand the lateral pressure force of around 20 Kg/cm$^2$. However, typical rubber V belts in practical use at present are usually used under the condition of less than 4–5 Kg/cm$^2$ and even rubber V belts for high load cannot be used under the condition of more than 10 Kg/cm$^2$. This is because the rubber V belt buckles and deforms by high lateral pressure, with the result that it is broken finally by its generation of heat.

In the above-mentioned metallic V belt, the block is not fixed to the metallic load carrier but slides on the metallic load carrier for transmission by compressive force between blocks. It has been suggested to eliminate impact sound between hard blocks and thereby reduce belt noises during running by setting in hard blocks and elastic blocks alternately (Japanese Patent Application Laying Open Gazette No. 56-120848). Such construction of the metallic V belt, however, involves the decrease of the area in which the V belt receives pressure and reduction of anti-lateral pressure property because lateral pressure force applied by the transmission pulley concentrates upon hard blocks due to the difference in the coefficient of elasticity between elastic blocks and hard blocks. Thus, transmitting ability is reduced and wear of the belt (especially wear of blocks) is accelerated due to the increase of slip. In addition, due to deformation and wear of elastic blocks, the fall phenomenon of hard blocks presents itself and the V belt breaks earlier due to wear and damage of the load carrier at the part where it contacts the hard block.

In order to improve fitness of blocks to the pulley groove, it is generally tried to improve the dimensional precision of blocks but this involves an increase in the cost of parts and resultant increase in the cost of a transmission. In view of such demerits in the aspect of cost, such a technique that notches which open at the underside edge of the metallic block are formed so that when lateral pressure force was applied to the slant side surface, elastic deformation is generated on the metallic block and consequently the angle of inclination of the slant side surface is changed has been disclosed (Japanese Patent Application Publication Gazette No. 57-65444). This technique, however, has a disadvantage in that the forward end portion of the notch is cracked.

SUMMARY OF THE INVENTION

The present invention has for its main object to provide a V belt which is suitable for high load transmission and eliminate demerits of the rubber V belt and the metallic V belt mentioned above. The V belt according to the present invention is characterized in that it comprises two endless load carriers and a plurality of blocks fitted to said two load carriers in such a fashion that these blocks are relatively immovable in the lengthwise direction of belt and while said load carriers have elastomers and tensile members embedded in said elastomers, said blocks are made of plastics or hard rubber and have slant side surfaces which substantially fit the surfaces of the groove of a pulley on which said V belt is wound and slots formed from said slant side surfaces toward the central part, in which load carriers are fitted.

Another object of the present invention is to provide a V belt to which a high lateral pressure can be applied, as compared with a conventional rubber V belt, and which has large transmitting capacity.

A still another object of the presnt invention is to provide a V belt which is light in weight, as compared with a conventional metallic V belt (about 1/5–¼), has a small centrifugal force during running, is suitable for high speed running and is advantageous in the aspect of safety.

A further object of the present invention is to provide a V belt having blocks made of non-metallic material, such as plastics or hard rubber, which does not require lubrication of the surface at which it engages with a metallic transmission pulley and is applicable to a dry type transmission.

The above and other objects and novel features of the present invention will be more apparent from the following description made with reference to the accompanying drawings.

BRIEF DESCRIPTION OF THE DRAWINGS

The accompanying drawings show preferred embodiments of the present invention, in which:

FIG. 1 is a side view showing a part of the V belt according to the present invention;

FIG. 2 is a cross sectional view, taken along the line II—II in FIG. 1 and shows the state in which the V belt is separate from a pulley;

FIG. 3 is a perspective view of a block to be used for the V belt shown in FIG. 1;

FIG. 4 is a perspective view, showing a part of the load carrier to be used for the V belt shown in FIG. 1;

FIG. 5 is a cross sectional view, showing that the V belt shown in FIG. 1 is in engagement with the pulley and in the state of power transmitting;

FIGS. 15 (a), (b), (c), FIG. 16, FIG. 17, FIG. 18 and FIGS. 19 (a), (b), (c) shows respectively a modified example of the block to be used for the V belt shown in FIG. 14;

FIGS. 25 (a), (b) show respectively an elevational view in section of the block to be used for preventing wear of the load carriers;

FIG. 26 and FIG. 27 show respectively a modified example of the block shown in FIG. 25;

FIG. 28 is a side view, similar to FIG. 1, of the V belt with blocks having ribs at its upper end surface and its lower end surface;

DESCRIPTION OF INVENTION

Figure 6:
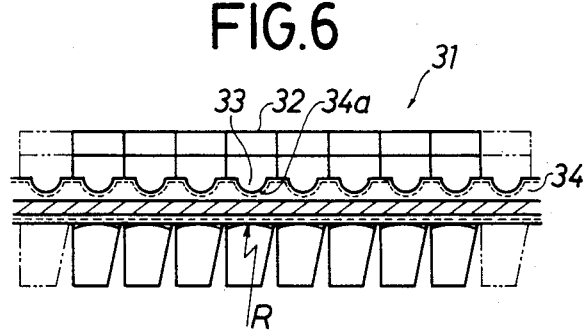
FIG. 6 is a side view, similar to FIG. 1, of the V belt with the lower surface of the slot of the block with which the load carrier engages made a convex surface of a proper curvature.

Preferred embodiments of the present invention are described below with reference to the accompanying drawings.

Referring first to FIG. 1 and FIG. 2 showing a preferred embodiment of a V belt 1 of the present invention, the V belt 1 is composed of two load carriers 2, 3 and a plurality of blocks 4 mounted compactly on the load carriers 2, 3 in the lengthwise direction of the belt. The blocks 4 are made of non-metallic material, such as plastics or hard rubber, having the large coefficient of friction and high abrasion resistance.

The sides 4a and 4b of the block 4 are slant, forming a belt angle a to correspond substantially to the groove angle of a pulley. Opposed surfaces 4e, 4f at the underside of adjoining blocks 4 are such that the surface 4f is slant but the surface 4e is perpendicular, thereby forming the angle $\beta$ to correspond to the minimum pitch diameter of the V belt. As shown in FIG. 3 in detail, slots 5, 6 which are open at the side surfaces 4a, 4b respectively and extend toward the central part of the block 4 are formed at the sides of the block 4. Provided at upper surfaces 5a, 6a and lower surfaces 5b, 6b of each slot are projections 6 (only projections 6c, 5d and 6d formed at the upper surface 6a and the lower surfaces 5b, 6b are shown in the drawing).

For the purpose of making the V belt lighter in weight, the upper surface 4e and the lower surface 4d of the block 4 are formed in the convexed shape and the concaved shape respectively.

Each of the load carriers 2, 3 comprises a plurality of tensile members 7 arranged substantially on the same plane, elastomers 8, 9 to support the tensile members 7 and woven fabrics 10, 10 and 11, 11 embedded close to the upper surfaces and the lower surfaces of the load carriers 2, 3 respectively. One side 2a, 3a of each of the load carriers 2, 3 has an incline which is substantially the same as that of the side surfaces 4a, 4b of the block 4, but the other side 2b, 3b has no such inclination. As shown in FIG. 4, concaved parts (only 3c, 3d of the load carrier 3 are shown in the drawing) which engage with the convexed parts made in the slots 5, 6 of the block 4 are made at the upper surface and the lower surface of each of the load carriers 2, 3. The convexed part of the block 4 and the concaved part of the load carriers 2, 3 are a means of power transmission between the block 4 and the load carriers 2, 3 and it is possible to provide the concaved part at the block side and the convexed part at the load carrier side for engagement with each other. It is also possible to make the slots 5, 6 of the block 4 engage with either the upper surface or the lower surface of the load carriers 2, 3. Furthermore, it is possible to employ a chemical fixing means using an adhesive in combination with the engagement means. For the purpose of preventing noises, it is possible to make the concaved parts of the load carriers 2, 3 at a random pitch in lengthwise direction of the belt.

Tensile members 7, 7 which compose the load carriers 2, 3 are generally made of synthetic fibers, such as polyamide, polyester, polyaramid, etc., inorganic fibers such as steel fiber, glass fiber, carbon fiber, etc., twisted cords of mixed spinning or mixed twisting of the foregoing fibers, woven fabric or sheet-like substance. On the other hand, materials having a high compression Young's modulus, high abrasion resistance, etc. are required for elastomers 8, 9 and conventional synthetic rubber is used generally for them. Materials having high flexuosity and high abrasion resistance are required for woven fabrics 10, 11 and fabrics woven of mixed spun yarns or mixed twisted yarn of cotton, polyamide, polyester, polyaramid, etc. are used generally for them. In the case of a comparatively light load, woven fabric can be dispended with or a synthetic resin sheet can be used as a substitute for woven fabric.

It is desirable that the side surfaces 2a, 3a of the load carriers 2, 3 are on the same plane with the side surfaces 4a, 4b of the block 4 when they engage with the groove of a transmission pulley (refer to FIG. 5).

The two load carriers 2, 3 and the block 4 are immovable in lengthwise direction of the V belt 1 but the block 4 is detachable in transverse direction of the V belt 1.

Under the above construction, in the state where the V belt 1 is away from the pulley 21 and is free from the side pressure as shown in FIG. 2, the side surfaces 2a, 3a of the load carriers 2, 3 slightly project from the side surfaces 4a, 4b of the block 4 respectively. This is because the compression Young's modulus of the load carriers 2, 3 depends substantially upon the elastomers 8, 9 and is smaller than that of the block 4.

In FIG. 5 showing the state of power transmission when the V belt 1 engages with the pulley 21 and is subjected to a lateral pressure force, the side surfaces 4a, 4b of the block 4 and the side surfaces 2a, 3a are substantially on the same plane respectively. Thus, friction transmission force with the pulley 21 is generated at all side surfaces 4a, 4b, 2a, 3a. In this case, the block 4 made of plastics, hard rubber or the like has a large compression Young's modulus and therefore the V belt 1 stands a high lateral pressure and the transmission torque becomes large. However, when the torque is comparatively small, the side surfaces 2a, 3a of the load carriers 2, 3 need not be on the same plane with the side surfaces 4a, 4b of the block 4.

The specific gravity of the block 4 is usually less than 2.0 and therefore the V belt is considerably light i weight, as compared with a metallic V belt, and its centrifugal force is small. This means that the V belt 1 is suitable for high speed running and is advantageous in the aspect of safety.

The load carriers 2, 3 generally present the appearance of a thin, flat belt, have very good flexuosity and keep slight heat in running condition. Such features of the load carrier ensures a longer belt life.

When the V belt 1 proceeds from the state of separation from the pulley 21 to the state of engagement with the pulley during running, the load carriers 2, 3 first engage with the pulley 21 and are subjected to compression action and thereafter the block 4 engages with the pulley 21. Therefore, the load carriers 2, 3 mitigate a shock which generates when the block 4 engages with the pulley 21, with the result of reduction of noises. Since each block 4 is immovable in lengthwise direction of the belt due to engagement of the convexed parts provided at the slots 5, 6 of the block 4 with the concaved parts provided at the upper surface and the lower surface of the load carriers 2, 3 but is made detachable in its transverse direction, fitting-in can be done easily.

Since the V belt 1 is gradually modified to suit the grooves of the pulley 21 due to wear of side surfaces of the block 4 and the load carriers 2, 3 which are in engagement state, high processing precision is not required for both the block 4 and the load carriers 2, 3.

FIG. 6 shows a V belt 31 which is improved further in flexuosity. A block 32 has a convexed part 33 at the upper surface of a slot and the radius of curvature R to suit the minimum pitch diameter of the V belt 31 is made at the lower surface of the slot. A load carrier 3, 4 has a concaved part 34a at its upper surface but has no ruggedness at its lower surface.

By the action of the radius of curvature R made at the lower surface of the block 32, a polygonal phenomenon of the tensile members which usually presents itself while the V belt is in engagement with the pulley is eliminated and thus smooth running is carried out.

Figure 7:
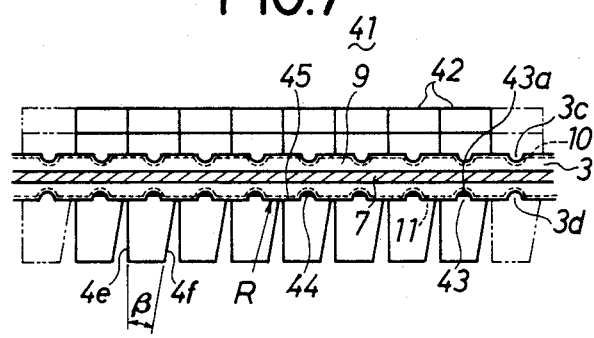
FIG. 7 is a side view showing a part of the V belt in which blocks and load carriers are fixed in the lengthwise direction of belt by engagement of the convexed part with the concaved part and a vacant space is formed between said convexed part and said concaved part in the vertical direction of the block.
Figure 8:
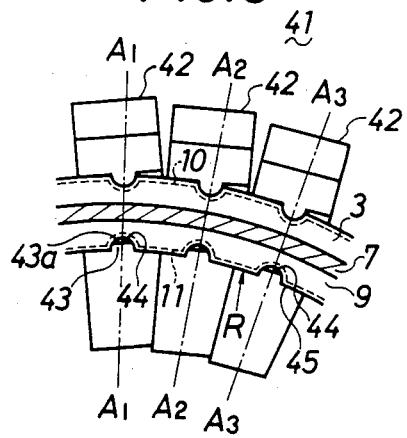
FIG. 8 is an explanatory diagram, showing the state in which the V belt shown in FIG. 7 is wound round a variable transmission drive pulley (not shown)

FIG. 7 shows a V belt 41 which can prevent earlier breakage of load carriers due to bending fatigue of tensile members in the load carrier. In this V belt, a convexed part 43 provided at a lower surface 45 of a slot of a block 42 is made flat at its top surface 43a and this flatness of the to surface 43a leaves a vacant space in engagement with a concaved part 3d of the load carriers 3. Accordingly, as shown in FIG. 8, the load carrier 3 contacts a lower surface 45 which is adapted to have a radius of curvature R under the condition where the V belt 41 is wound round pulleys and the load carrier 3 does not bend at the line $A_1$—$A_1$, the line $A_2$—$A_2$ and the line $A_3$—$A_3$, with the result that tensile members 7 of the load carrier 3 (and the load carrier 2) are free from bending fatigue.

Figure 9:
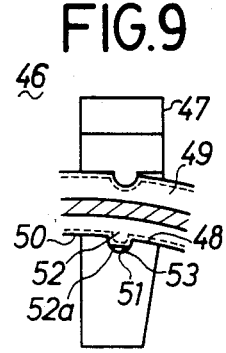
FIG. 9 is a side view, showing a modified example of the V belt in FIG. 7.

As shown in FIG. 9, it is possible to engage a concaved part 51 of a block 47 with a convexed part 52 of a load carrier 49 as a means of engaging a lower surface 48 of a slot of the block 47 with a lower surface 50 of the load carrier 49 and to provide a vacant space 53 by forming a top surface 52a of the convexed part 52 flat.

Figure 10:
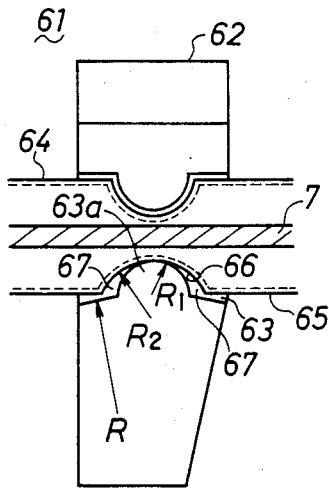
FIG. 10 is an enlarged cross sectional view of a part of the V belt, in which the block is immovable in the lengthwise direction of belt due to its engagement with the load carriers by the convexed part and the concaved part and a vacant space is formed in the lengthwise direction between said convexed part and said concaved part.

FIG. 10 shows a V belt which has good flexuosity and is applicable to a pulley of small diameter. In this V belt 61, it is so adapted that a radius of curvature $R_1$ of a convexed part 63a provided at the lower surface of a slot (only the slot 63 is shown) and a radius of curvature $R_2$ of a concaved part 66 provided at a lower surface 65 of a load carrier 64 are expressed by the formula $R_1 < R_2$. In other words, when the V belt 61 is in the state where it is separate from the pulley, vacant spaces 67, 67 are formed between the surfaces of the convexed part 63a and the concaved part 66. Therefore, when the V belt 61 engaged with a pulley at the minimum pitch diameter, the concaved part 66 provided at the lower surface 65 of the load carrier 64 is compressed and deformed at the part below the tensile member 7 of the load carrier 64 but, in reality, is deformed only to such an extent that it conforms substantially with the convexed part 63a provided at the slot 63 of the block 62. Thus, the V belt 61 fits a pulley at all times and is free from loss of flexuosity. The concaved part at the lower surface of the load carrier is composed by only the curved surface of the radius of curvature $R_2$ as mentioned above, but it is possible to compose it by the combination of a curved surface and a plane surface, namely, it is possible to form a vacant space between surfaces of the convexed part and the concaved part whose front and rear sides in lengthwise direction of belt are made plane.

Figure 11:
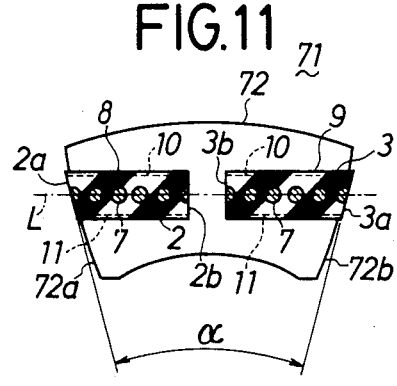
FIG. 11 is a cross sectional view, similar to FIG. 1, showing that the side surfaces of the block are projecting outwardly.
Figure 12:
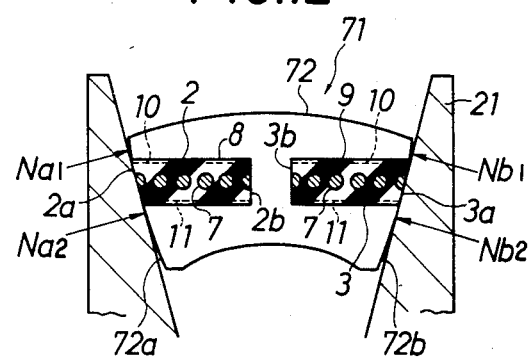
FIG. 12 is a cross sectional view, similar to FIG. 5, of the V belt shown in FIG. 11.

FIG. 11 shows a V belt 71 having a block 72, 72 whose side surfaces 72a, 72b project slightly outwardly with a pitch line L as the center for preventing breakage of the block. As shown in FIG. 12, when the V belt 71 engages with the pulley 21 and is subjected to a lateral pressure force (in the state of power transmitting), the side surfaces 72a, 72b of the block 72 are in slightly convex surface shape as if it projected outwardly and therefore lateral pressure force Na (Na$_1$+Na$_2$) and Nb (Nb$_1$+Nb$_2$) are well balanced and no unreasonable load (bending stress) is applied to the block 72. The above-mentioned "convex surface shape" includes the curved surface shape and the combination of two plan surfaces in angle shape.

Figure 13:
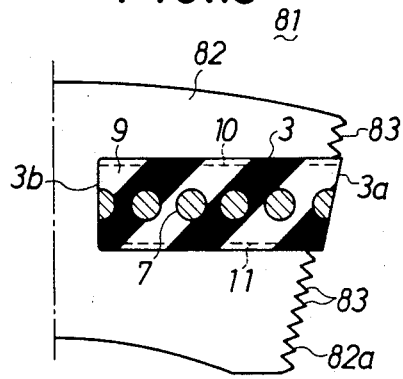
FIG. 13 is a cross sectional view, similar to FIG. 2, showing the right half part of the V belt, on an enlarged scale, with minute projections formed at both sides of the block.

FIG. 13 shows a V belt having good affinity to a pulley. This V belt 81 has many minute projections 83 at the both side surfaces (only the side surface 82a is shown). These projections 83 are so formed that they become thinner toward a forward end, like a conical form, a truncated cone, etc., namely, it is so adapted that the sectional area of the projection 83 in parallel with the groove surface of the pulley becomes smaller as it is closer to the groove surface of the pulley.

The V belt 81, in the state where the block 82 and the load carrier 3, 2 engage with the pulley 21, wears at the side surfaces of the block 82 and is modified to suit the groove of the pulley 21. Since the side surfaces of the block 82 have minute projections 83, the V belt 81 takes the shape to suit the groove of the pulley easily. Therefore, no severe dimensional precision is required for the block 82 and the load carrier 3 (and 2).

In the above embodiment, minute projections are made uniformly on all the side surfaces of the block 82 but this arrangement is not necessarily required and the distribution density of projections can be varied at each part of the side surfaces.

Figure 14:
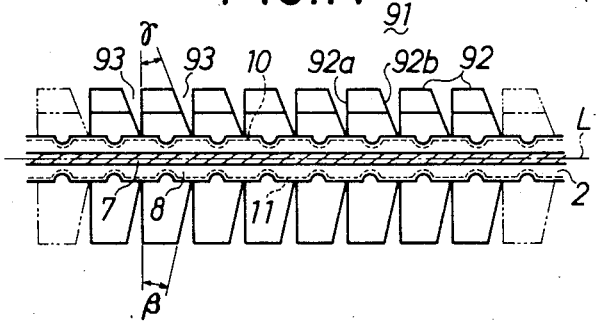
FIG. 14 is a side view, similar to FIG. 1, showing the V belt with vacant spaces formed between adjacent upper side parts of the blocks.

FIG. 14 shows a V belt which can prevent generation of noise, such as clash of blocks due to shaking of blocks. In this V belt 91, upper opposed surfaces 92a, 92b of blocks 92 above the pitch line L are formed in such a fashion that the surface 92a is perpendicular but the surface 92b is slant, forming the minimum angle δ which leaves between the opposed surfaces a vacant space by which adjoining blocks do not contact each other even if longitudinal oscillation (longitudinal oscillation of blocks 92) of the V belt 91 took place during running and accordingly generation of noise can be prevented.

As the block for preventing noise caused by longitudinal oscillation, besides the block shown in FIG. 14, those blocks shown in FIGS. 15 (a), (b) and (c) are available. A block 101 shown in FIG. 15(a) has an upper opposed perpendicular surface 101a and an upper opposed curved surface 101b. A block 102 shown in FIG. 15 (b) has upper opposed surfaces 102a, 102b, both of which at slant and a block 103 shown in FIG. 15 (c) has upper opposed surfaces 103a, 103b, both of which are curved surfaces. In short, any block will do so long as a vacant space between the upper opposed surfaces expands outwardly in vertical direction.

Further, such blocks as shown in FIG. 16, FIG. 17, FIG. 18 and FIGS. 19 (a), (b), (c) are available for for preventing noise. A block 104 shown in FIG. 16 has a perpendicularly flat surface 104b near the pitch line L at the side where an upper opposed slant surface 104a is made to form a vacant space between the upper opposed surfaces. In order to prevent noise caused by lateral shake by forming a vacant space which expands outwardly in right and left directions from the central part of block between the opposed blocks, a block 105 shown in FIG. 17, for example, has right and left front side opposed surfaces 105a, 105b which slant in such a fashion that said surfaces become thinner toward the right and left sides, but such slant may be made either of 105a and 105b. The angle δ is an angle at which blocks 105, 105 do not collide with each other even if lateral shake took place. A block 106 shown in FIG. 18 has slant right and left front side opposed surfaces 106a, 106b which are combined by a flat surface 106b. A block 107 shown in FIG. 19 (a) has right and left front side opposed surfaces 107a, 107b which are formed in curved surface shape, but such curved surface shape may be made either of 107a and 107b. A block 108 shown in FIG. 19 (b) has front side and rear side right and left opposed surfaces 108a, 108b, 108c, 108d which are all slant. A block 109 shown in FIG. 19(c) has right and left opposed surfaces at front and rear sides 109a, 109b, 109c, 109d, all of which are curved surfaces.

Furthermore, in the case where complicated shake, such as longitudinal shake combined with sideways shake, took place at the block, noise to be caused by such complicated shake can be prevented by proper combination of the shapes of blocks (not shown in the drawing) mentioned above so as to form between opposed surfaces a vacant space which expands outwardly in vertical direction of blocks and outwardly in sideways direction of blocks.

Figure 20:
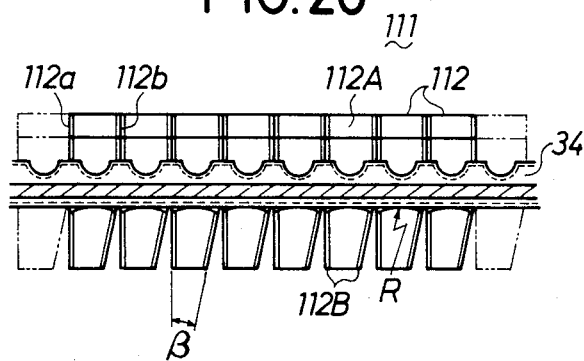
FIG. 20 is a side view, similar to FIG. 1, showing the V belt provided with blocks having a coating layer made of soft substance between surfaces of adjacent block propers.
Figure 21:
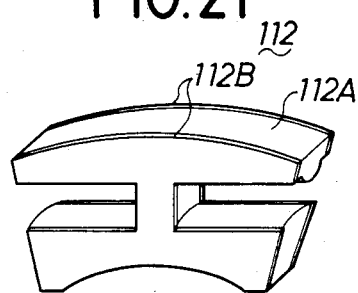
FIG. 21 is a perspective view of the block to be used for the V belt shown in FIG. 20.

FIG. 20 shows a V belt 111 which involves slight noise and has a longer usable life. A block 112 of this V belt 111, as shown in FIG. 21, has a coating layer 112B of soft substance B provided integrally for opposed surfaces 112a, 112b of a block proper 112A made of hard resin A which makes contact with the pulley surface of a pulley for frictional transmission. This coating layer 112B will not exfoliate in use.

The resin A is free from buckling and deformation by pressure from the pulley side and is not melted by heat generated by slip on the pulley surface. In general, hard resin having high heat resistance is used, for example, thermosetting resin such as phenol resin, polyimido resin, epoxy resin, etc., or thermoplastic resin having high heat resistance such as polyphenylene sulfide resin (PPS), aromatic polyamide resin, polyetherimido resin, polyamidoimido resin, polyether ethereal ketone resin, etc. are used singly or in compounding with short fiber, etc. Resin A is a hard resin of very high elasticity and if the block 112 is composed by this resin without coating layers 112B, impact sound between block propers 112A is very high.

Materials available for the soft substance B are thermoplastic resin such as engineering plastics, polyacetal, polyptylenterephthalate, aliphatic polyamide resin, polyethylene, polypropylene, ethylenpropylene copolymer, ethylene - vinyl acetate copolymer, plasticized PVC, thermoplastic urethane, etc. or thermoplastic elastomer or bridge type elastomer, such as natural rubber, synthetic rubber, polyurethane, etc., all of which are less than 30,000 Kg/cm$^2$ in the coefficient of elasticity.

Integration of the resin A and the soft substance B can be effected easily by the so-called multi-color injection process, if both of them are thermoplastic resin. A boundary surface between the resin A and the soft substance B can be made rugged to increase adhesive strength.

Integration of the resin A and the soft substance B can also be effected by applying a solution or liquid of the soft substance B to the surface of the resin A and then drying it or hardening it by heating (vulcanizing it), where necessary. In this case, it goes without saying that an adhesion treatment process can be employed for the interface. If the side surface of the resin A (the friction surface with the pulley) is covered with the soft substance B, it must be removed by grinding.

In order to make the contact surface of the block proper 112A with the pulley as large as possible from the aspect of transmitting ability and to avoid the fall phenomenon of the block 112, it is advisable to make the coating layer 112B as thin as possible. The thickness of the coating layer is usually selected from within the range of 0.2–1.5 mm.

It has been confirmed that if the coating layer 112B is not integrated with (is not adhered to) the block proper 112A, lateral slip or vertical slip of the coating layer 112B takes place, with the result that the coating layer 112B bites in the between the block proper 112A and the load carrier, the V belt vibrates abnormally during high speed running, or the load carrier wears. Therefore, integration (adhesion) of the coating layer 112B and the block proper 112A is essential.

When the V belt shifts from the state of separation from the pulley to the engagement with the pulley, firstly the load carrier 34 engages with the pulley and is subjected to compression action and then the block 112 engages with the pulley. At this time, since the load carrier 34 mitigates the impact to be caused by engagement of the block 112 with the pulley, noise of the V belt 111 is reduced. In addition, clash of blocks 112, 112 is also decreased. Thus, the V belt runs with slight noise.

Figure 22:
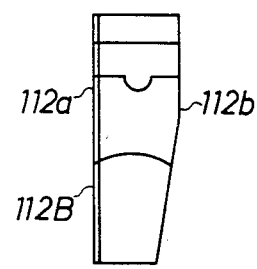
FIG. 22, FIG. 23 and FIG. 24 show respectively a modified example of the block shown in FIG. 21.

As shown in FIG. 20, the coating layer 112B comprising the soft substance B is formed at the opposed surfaces 112a, 112b, but the coating layer may be formed only at one surface 112a (or 112b) as shown in FIG. 22.

Figure 23:
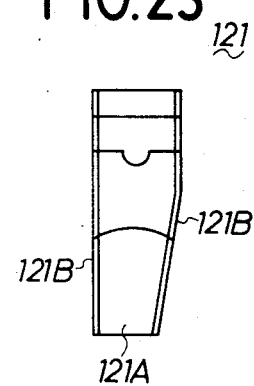
Figure 24:
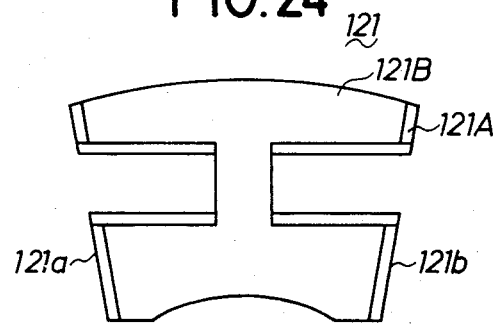

In the case where it is so constructed that the soft substance B and the resin A contact the pulley simultaneously, as shown in FIG. 21, such trouble as exfoliation of boundary surface and (if the soft substance B is low in the coefficient of friction) abnormal slip of the belt due to worn off powder interposing between the hard resin A and the pulley takes place. Such trouble can be eliminated by dispensing with the coating layer 121B comprising the soft substance B which covers the block 121A comprising the hard resin A at the side surfaces 121a, 121b of the block 121, as shown in FIG. 23 and FIG. 24.

FIGS. 25 (a), (b) show a block 131 of the V belt which inhibits wear of the load carrier and prevents breakage of it. This block 131 comprises a block proper 131A covered with a lubricative resin layer 131B and therefore the contact surface between the load carrier and the pulley wears less due to the lubricating action of the lubricative resin layer 131B, with the result that the load carrier is neither cracked nor broken.

The above lubricative resin layer 131B is provided at the portions where the block 131 contacts the load carrier, namely, the inside surface of a slot 132, 133 (the upper and lower surfaces 132a, 133a, 132b, 133b and the side surface 132c, 133c). This is enough for preventing the wear of the load carrier but it is of course effective to cover the whole surface of the block 131, excepting the contact surfaces with the pulley (side surfaces 131a, 131b) with the lubricative resin layer 131D, as shown in FIG. 26.

As the material of the block proper 131A of the block 131, hard resin having the high coefficient of friction is used to let the block 131 stand the lateral pressure from the pulley and do the friction transmitting. On the other hand, as the material of the lubricative resin layer 131B, 131D, self-lubricative resin such as polyacetal resin, nylon resin, telfon resin, etc. can be used as they are or resin, having no self-lubricacy can be used with addition of a solid lubricant, such as graphite, carbon fiber, molybdenum desulfide, etc., or a liquefied lubricant.

In order to improve adhesion between the lubricative resin layer 131B, 131D and the block proper 131A, it is advisable to use the same base resin for the resin A which composes the block proper 131A and the lubricative resin B, to reinforce the resin A with aromatic polyamide short fiber, glass fiber, etc. for obtaining the higher coefficient of friction, to compound the base resin with a lubricant to obtain the resin B and to integrate both A and B by a two-color plastic injection. Also, it is better to make the adhesion boundary surface rugged.

In order to improve flexuosity of the V belt, a block 141 may be constructed as shown in FIG. 27. In FIG. 27, reference number 141A is a block proper and reference number 141B is a lubricative layer. The basic shape of this block 141 is similar to the block 32 of the V belt shown in FIG. 6.

Figure 29:
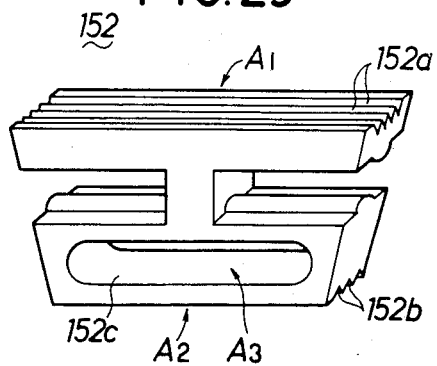
FIG. 29 is a perspective view of the block to be used for the V belt shown in FIG. 28.

FIG. 28 shows a V belt 151 having good heat-radiativity and good fitness to the pulley, yet lighter in weight. In this V belt 151, a plurality of heat radiating ribs 152a, 152b are made at the upper and lower end portions of the block 152 in the transverse direction of belt, as shown in FIG. 29, to increase the surface area and to compose the heat-radiating portions $A_1$, $A_2$. A hollow portion 152C which passes through the block in lengthwise direction of belt is formed at the lower part of the block 152 as a heat-radiating portion $A_3$. These heat-radiating portions $A_1$, $A_2$, $A_3$ contribute to the lightening in weight of the block 152, especially the hollow portion 152C which constitutes the heat-radiating portion $A_3$ regulate the rigidity of the block 152 in transverse direction of belt and improves fitness to the pulley on which the V belt 151 is wound. Therefore, the V belt 151 stands the high lateral pressure thanks to the block 152 having a large compression Young's modulus and is imparted with high transmitting ability. In addition, when the V belt 151 is in the state of power transmitting, the amount of heat generated at the V belt 151 (especially at the block 152) is emitted effectively into the atmosphere owing to the multiplied effect of the heat-radiating portions $A_1$, $A_2$, $A_3$ and thus overheating of the V belt 151 (the block 152) can be prevented.

Since the rigidity of the block 152 in transverse direction of belt is regulated by the hollow portion 152C, the block 52 (the V belt 151) can be wound round the pulley fittingly.

Figure 30:
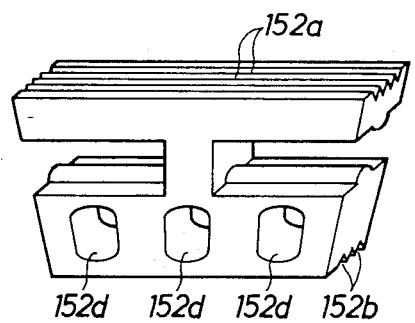
FIG. 30 and FIG. 31 are perspective views of a modified example of the block to be used for the V belt shown in FIG. 28.
Figure 31:
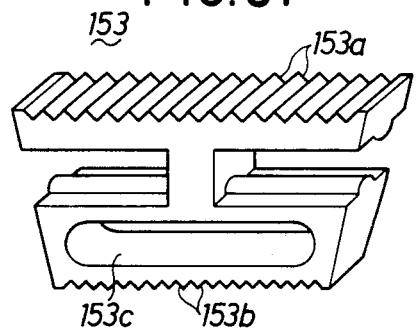

In the above embodiment, a comparatively large hollow portion 152c is provided at the lower part of the block 152 but the arrangement of a plurality of hollow portions 152d, as shown in FIG. 30, produces a similar effect. Positions at which hollow portions are made are not necessarily limited and it is possible to provide heat-radiating ribs 153a, 153b in lengthwise direction of belt and the hollow portion 153c at the upper and lower surfaces of the block 153, as shown in FIG. 31.

The embodiments described hereinabove refer to the V belt which obtains the friction transmitting force with the pulley at the side surfaces of the V block and at the side surfaces of the load carrier as a whole but is applicable to the V belt which obtains the friction transmitting force at only the side surfaces (a part or the whole) of the block.

As the present invention can be embodied in various types without departing from its substantial characteristics, the above embodiments have been given solely for explanation purposes and are not of restrictive nature. Furthermore, as the scope of the present invention is not limited by the description made preceding the claim but is limited by the scope of claim for patent, any change in the requirements of the scope of claim for patent and equivalents to such requirements are included in the scope of claim for patent.

I claim:

1. A V belt adapted to be wound around at least two pulleys, comprising two endless load carriers and a plurality of blocks which are engaged with said two load carriers substantially immovable in lengthwise direction of belt, said load carriers being elastomeric and having tensile members embedded therein, said tensile members being twisted cords, a woven fabric or sheet-like substance comprising synthetic fibers such as polyamide, polyester, polyaramide or inorganic fiber such as steel fiber, glass fiber, carbon fiber or mix spinning of mix twisting of such fibers, said block being composed of plastics such as thermo-setting resin or thermo-plastic resin or hard rubber and having slanted side surfaces to substantially fit the surface of a groove of said pulley, slots which extend from said slanted surface toward the central part of the block and in which the load carriers are fitted, and said load carrier having an upper surface and a lower surface and said slots providing an upper and lower surface, at least one of said surfaces of said load carriers having a transverse concave or convex part and at least one of said surfaces of said slot having a concave or convex part corresponding to and engageable with said load carrier part, whereby the block and the load carrier are correspondingly engaging each other immovable in lengthwise direction of belt and detachable transverse belt.

2. A V belt as defined in claim 1, wherein a vacant space is formed in vertical direction of the block between the concaved part or the convexed part of the load carrier and the convexed part or the concaved part at the lower surface of the slot of the block.

3. A V belt as defined in claim 1, wherein a vacant space is formed in lengthwise direction of belt between the concaved part or the convexed part of the load carrier and the convexed part or the concaved part at the lower surface of the slot of the block, whereby absorbing compression and deformation to which the load carrier was subjected on the pulley by its bending.

4. A V belt as defined in claim 1, wherein the side surface of the block is formed in a curved surface shape projecting outwardly.

5. A V belt as defined in claim 4, wherein the side surface of the block is a convex surface shape with a pitch line as a center.

6. A V belt as defined in claim 1, wherein the block has at the side surface thereof many minute projections.

7. A V belt as defined in claim 6, wherein said projections become thinner toward a forward end, like a conical form.

8. A V belt as defined in claim 1, wherein a vacant space is formed between upper opposed surfaces of the slots of each block between opposed surfaces on opposing sides of the central part.

9. A V belt as defined in claim 8, wherein a vacant space between upper opposed surfaces or between right and left opposed surfaces of each block expands outwardly in vertical direction or outwardly in lateral direction.

10. A V belt is defined in claim 1, wherein a block has a coating layer made of soft substance at least at one of the opposed surfaces of the block.

11. A V belt as defined in claim 10, wherein the coating layer is lacking near the side surface of the belt.

12. A V belt as defined in claim 10 or claim 11, wherein the coefficient of elasticity of the soft substance is less than 30,000 Kg/cm$^2$.

13. A V belt as defined in claim 1, wherein the block is provided with a lubricative resin layer at least at the part where it contacts the load carriers.

14. A V belt as defined in claim 13, wherein the lubricative resin layer is made of basic resin compounded with a lubricant, said basic resin being the same as that of the block proper.

15. A V belt as defined in claim 1, wherein the block has a plurality of heat-radiating ribs made at the upper and lower end portions thereof and a hollow portion passing through the block in lengthwise direction of the belt.

16. A V belt as defined in claim 1, wherein the lower surface of the slot in the block is in the shape of a curved surface of a radius of curvature.

17. A V belt as defined in claim 1, wherein the top portion of the block projects upwardly at substantially the central part thereof and is in the shape of convexed surface.

18. A V belt as defined in claim 1, wherein the bottom portion of the block is hollow upwardly at substantially the central part thereof and is in the shape of convexed surface.

* * * * *